(12) United States Patent
Steen et al.

(10) Patent No.: US 10,920,506 B2
(45) Date of Patent: Feb. 16, 2021

(54) METHODS FOR WELLBORE MILLING OPERATIONS

(71) Applicant: STEP ENERGY SERVICES LTD., Calgary (CA)

(72) Inventors: Matt Steen, Calgary (CA); John Cairns, Calgary (CA); Bailey Epp, Calgary (CA)

(73) Assignee: STEP ENERGY SERVICES LTD., Calgary (CA)

(*) Notice: Subject to any disclaimer, the term of this patent is extended or adjusted under 35 U.S.C. 154(b) by 38 days.

(21) Appl. No.: 16/383,194

(22) Filed: Apr. 12, 2019

(65) Prior Publication Data

US 2019/0316431 A1 Oct. 17, 2019

Related U.S. Application Data

(60) Provisional application No. 62/657,507, filed on Apr. 13, 2018, provisional application No. 62/719,036, filed on Aug. 16, 2018.

(51) Int. Cl.
| | |
|---|---|
| *E21B 4/02* | (2006.01) |
| *E21B 21/00* | (2006.01) |
| *C09K 8/035* | (2006.01) |
| *E21B 29/00* | (2006.01) |
| *E21B 37/00* | (2006.01) |

(52) U.S. Cl.
CPC ............ *E21B 21/003* (2013.01); *C09K 8/035* (2013.01); *E21B 29/002* (2013.01); *E21B 4/02* (2013.01); *E21B 37/00* (2013.01)

(58) Field of Classification Search
CPC .......... E21B 21/00; E21B 21/003; E21B 4/02; C09K 8/035; C09K 8/34; C09K 8/44
See application file for complete search history.

(56) References Cited

U.S. PATENT DOCUMENTS

| | | | | |
|---|---|---|---|---|
| 6,105,691 | A * | 8/2000 | Hayatdavoudi | C09K 8/04 175/70 |
| 9,394,474 | B2 * | 7/2016 | Brooks | C09K 8/54 |
| 10,240,449 | B1 * | 3/2019 | Scanlan | C09K 8/88 |
| 10,458,240 | B2 * | 10/2019 | Purcell | F01C 21/08 |
| 2001/0050172 | A1 | 12/2001 | Tolman et al. | |
| 2017/0175498 | A1 | 6/2017 | Segura | |
| 2018/0273823 | A1 * | 9/2018 | McDaniel | C09K 8/92 |
| 2018/0274297 | A1 * | 9/2018 | Pearson | E21B 4/02 |
| 2019/0270925 | A1 * | 9/2019 | Mahmoud | C09K 8/265 |
| 2019/0338597 | A1 * | 11/2019 | Davis | E21B 3/00 |
| 2020/0123873 | A1 * | 4/2020 | Sherman | E21B 33/13 |

FOREIGN PATENT DOCUMENTS

CA 3044350 * 5/2018 ............ E21B 7/06

* cited by examiner

*Primary Examiner* — Kenneth L Thompson
(74) *Attorney, Agent, or Firm* — Bennett Jones LLP

(57) ABSTRACT

A method for milling a wellbore structure comprising: pumping fluid through a mud motor and a milling tool while the milling tool and the mud motor are moved on a string to mill out a wellbore structure; and conveying a diversion agent with the fluid through the string, mud motor and milling tool to introduce the diversion agent to the wellbore, the diversion agent mitigating fluid loss in a low pressure zone.

25 Claims, 4 Drawing Sheets

METHODS FOR WELLBORE MILLING OPERATIONS

BENEFIT OF EARLIER APPLICATIONS

This application claims priority from U.S. provisional applications 62/657,507, filed Apr. 13, 2018 and 62/719,036, filed Aug. 16, 2018.

FIELD

The present invention relates to a wellbore method and, in particular, a method for wellbore milling operations to remove a structure in a wellbore.

BACKGROUND

In wellbore milling operations, milling fluid is often pumped down through a string and out through the string's distal end to return up the annulus. Fluid is circulated for various reasons such as to clean the hole, carry debris toward surface, support and lubricate the string, generate rotational drive and/or cool bottom hole components.

However, if a low pressure zone is encountered, the milling fluid can be lost to the formation. If fluid is lost to the formation, circulation may be interrupted and the debris may deposit in the well leading to a stuck string or other problems. A low pressure zone may also sometimes create a suction that sticks the string in the well.

SUMMARY

In accordance with a broad aspect of the present invention, there is provided a method for milling a wellbore structure comprising: pumping fluid through a mud motor and a milling tool while the milling tool and the mud motor are moved on a string to mill out a wellbore structure; and conveying a diversion material with the fluid through the string, mud motor and milling tool to introduce the diversion material to the wellbore, the diversion material mitigating fluid loss in a low pressure zone.

It is to be understood that other aspects of the present invention will become readily apparent to those skilled in the art from the following detailed description, wherein various embodiments of the invention are shown and described by way of illustration. As will be realized, the invention is capable of other and different embodiments and its several details are capable of modification in various other respects, all within the present invention. Accordingly the drawings and detailed description are to be regarded as illustrative in nature and not as restrictive.

BRIEF DESCRIPTION OF THE DRAWINGS

Referring to the drawings, several aspects of the present invention are illustrated by way of example, and not by way of limitation, in detail in the figures, wherein.

DESCRIPTION OF VARIOUS EMBODIMENTS

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

Figure 1A:
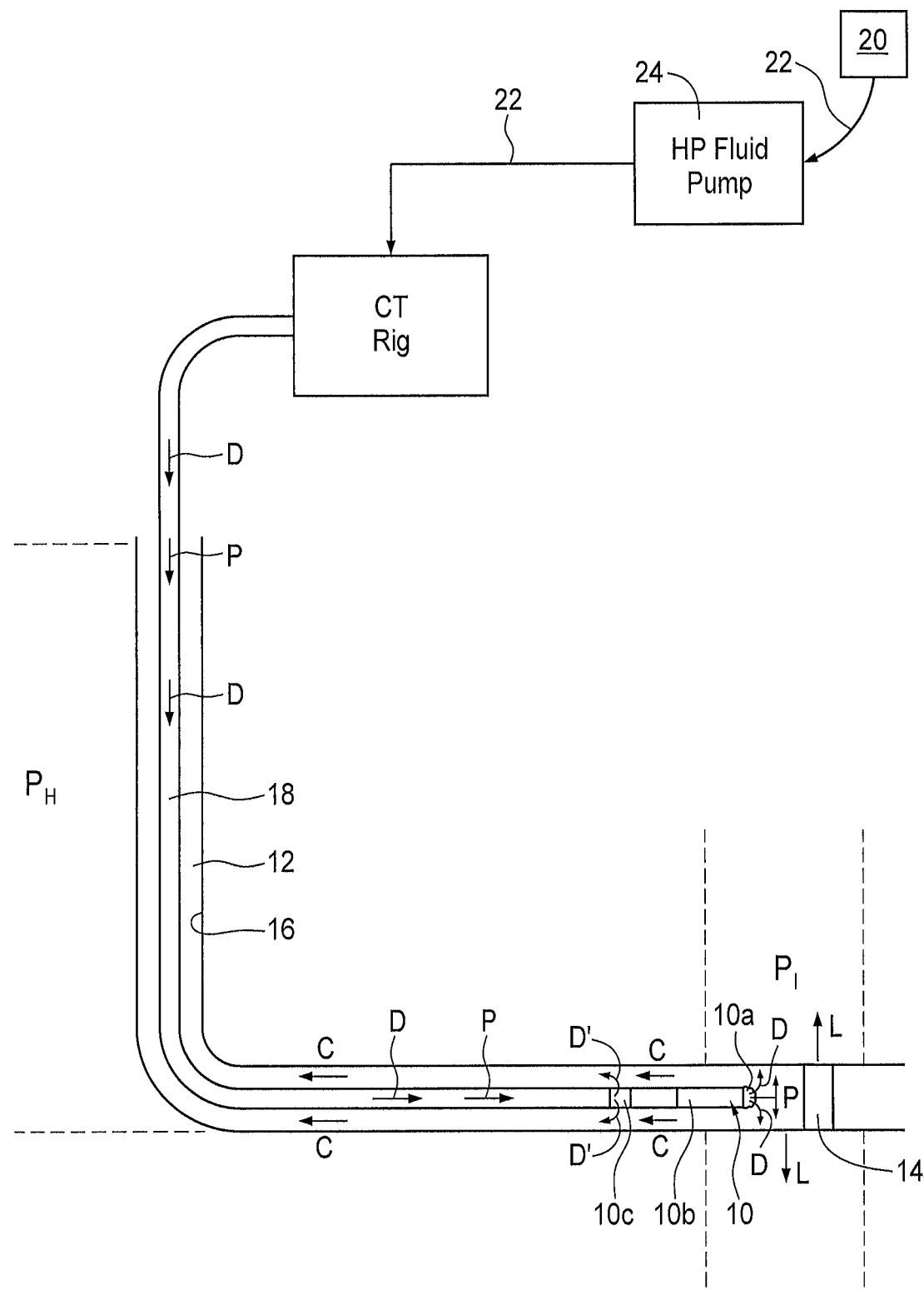
FIG. 1A is a sectional view through a wellbore with a milling assembly therein and FIG. 1B is an enlarged view of a bottom hole assembly partly in section.
Figure 1B:
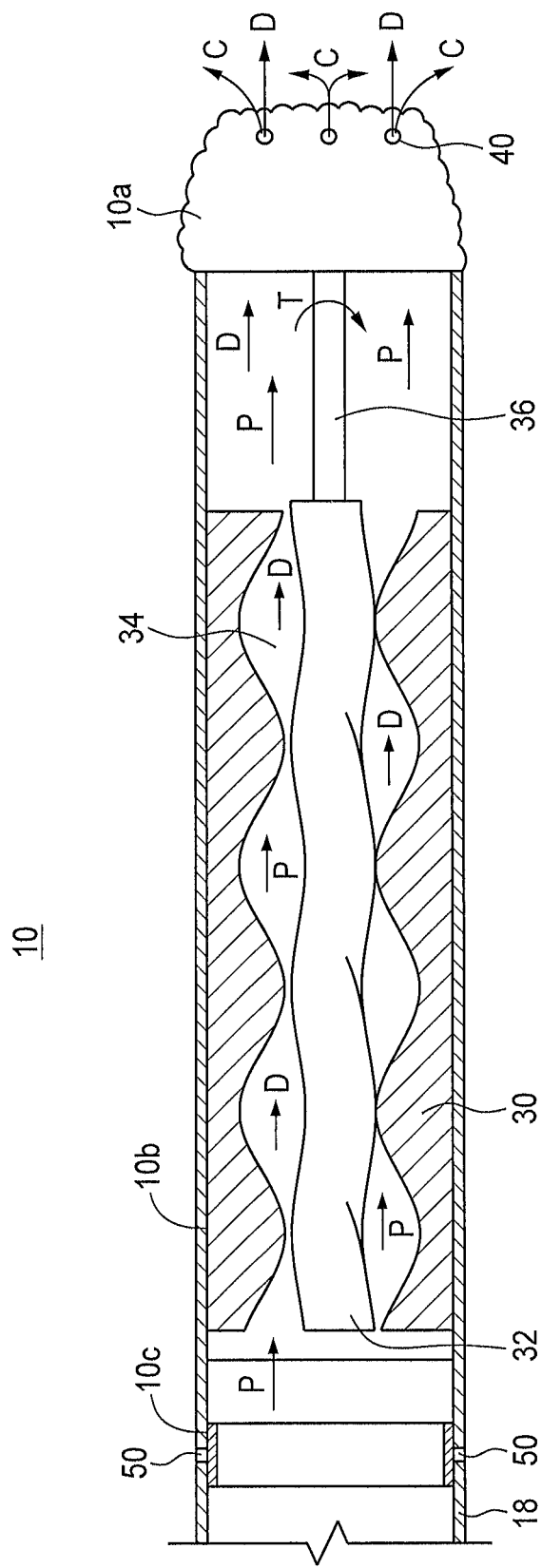

Wellbore milling operations employ a string carrying a bottom hole assembly. The bottom hole assembly is a milling assembly including a milling tool and a mud motor for converting fluid pressure to a rotational drive for the milling tool. A wellbore milling operation is illustrated in FIGS. 1A and 1B. In a milling operation, a milling assembly 10 is run into the well 12 and operated to mill out a structure 14 such as debris or an installation in the well. The well may be lined with casing 16 or other type of liner or the well may be partly or fully open hole.

Milling assembly 10 includes a milling tool 10a and a mud motor 10b.

The milling tool 10a is a form of bit with cutters for cutting into structure 14. Milling tool 10a also includes fluid outlets 40, such as nozzles.

Mud motor 10b is a downhole rotor/stator that converts fluid pressure passing through the motor to rotational drive for the milling tool. In particular, the mud motor often includes an elastomeric stator 30 and a rotor 32 therein. The rotor has one or more generally helical outer profiles extending down its length. The stator has two or more generally helical inner profiles extending down a central channel through its length. The helical outer profile of the rotor and the helical inner profile of the stator are configured to create, as the rotor eccentrically rotates within the stator, a series of cavities 34 down the length of the pump. By externally pumping a fluid through the progressing cavity pump, the rotor of the pump rotates, allowing rotational power to be extracted from the flow. When used as part of a milling string, such motors, commonly known as drilling or mud motors, utilize the flow of a milling fluid through the drill string to rotate downhole equipment, for example the milling tool. A transmission mechanism, such as a drive rod 36 connected the rotor, transmits rotation of the rotor to the milling tool. The mud motor is often known as a positive displacement or progressing cavity motor.

Milling assembly 10 is run in and moved through the wellbore on a string 18 such as drill pipe, coiled tubing or jointed tubing. The type of string may be selected according to the job requirements. In one embodiment, coiled tubing is employed for its rapid deployment and flexibility.

Fluid is pumped (arrows P) through the string and out through the milling tool nozzles. The fluid when passing through the mud motor generates a torque T that is communicated to rotate the milling tool. The fluid then continues to flow through the milling tool and out of the milling assembly through outlets 40 to thereby cool the bit and carry milled cuttings to surface (arrows C). The fluid C generates a pressure, called hydrostatic pressure $P_H$ in the wellbore.

A progressing cavity pump is, however, prone to stator damage by particulate matter in the fluid stream passing therethrough. As such, when particulate matter must be conveyed downhole, the pump must be pulled back to surface. This presents a problem in situations where hydrostatic pressure becomes higher than the formation. In particular, if a low pressure condition is encountered, such as zone $P_f$, the fluid can be lost (arrows L) to the formation. In other words, the fluid C that exits the milling tool may flow into the formation instead of circulating to surface. In such a situation, fluid loss materials should be introduced quickly to address the pressure loss but are damaging to the pump.

Surprisingly, however, a diversion agent 20 has been found to be useful for mitigating fluid loss. Diversion agent 20 is added to the milling fluid and pumped into the well. Diversion agent 20 circulates with the fluid and passes through the pump substantially without damaging the stator.

Diversion agent 20 can be introduced even if there is not yet a detected pressure loss. Alternately, diversion agent may be added only if a low pressure zone is encountered. A low pressure zone occurs when hydrostatic pressure $P_H$ is greater than formation pressure $P_f$. Thus, in one embodiment, when operating the milling assembly downhole the diversion agent is added to the milling fluid and pumped into the well. The diversion material is pumped through string 18 and out through the nozzles 40 to plug the formation at a low pressure zone, where fluid loss is occurring. As noted, surprisingly, the diversion agent passes readily through the mud motor and substantially does not damage the stator.

The diversion material can be mixed with fluid to form a slurry 22 and the slurry can be introduced, for example via a high pressure fluid pump 24, to the milling fluid. The fluid may be water, hydrocarbon, gas such as nitrogen or mixtures thereof. The diversion material, arrows D, is conveyed downhole with the fluid.

Diversion agent 20 is a solid particulate chemical material that can be carried in the fluid and is selected to self-remove within the reservoir, at reservoir conditions. Thus, while the formation is temporarily plugged with diversion agent, the diversion agent is removed automatically, by chemical process over time without damaging the formation. The diversion agent may be a solid selected to break down by hydrolysis. In one embodiment, the diversion agent is selected to break down to a product readily dissolved in water in less than 48 hours.

In one embodiment, the diversion agent is an ester or amide subject to break down by hydrolysis such as by acid-base catalyzed hydrolysis.

The diversion agent may be a solid particulate such as of 8 to 200 mesh, or 75 to 125 mesh and may be malleable/crushable to pass through a fluid passage such as a nozzle or passage of the motor, but creates a mechanical diversion at the formation, which creates a plug against pressure loss into the formation. The small particle size allows the diversion agent to penetrate the formation such that there is little impact on the wellbore diameter, for example it does not occlude the wellbore diameter. The solid particulate may remain solid in water for at least the time to complete an intervention, which may be for example, up to 48 hours. Thereafter, the solid particulate breaks down into smaller size monomers for self-removal.

Useful diversion agents include, for example, (a) polylactic acid, also known as polylactide resin such as CAS #9051-89-2; or

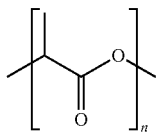

(b) isobutylidene diurea

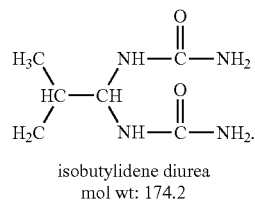

isobutylidene diurea
mol wt: 174.2

The above-noted diversion agents have low density such as 0.55-1.5 g/cm³ and have excellent carrying capacity in fluid. At wellbore conditions, the polylactic acid hydrolyses to lactic acid in water-based fluids in 6 to 48 hours. At wellbore conditions, isobutylidene diurea hydrolyses to urea in water-based fluids in 6 to 48 hours.

The concentration of diversion agent employed may be selected based wellbore parameters. In one embodiment, concentrations of 15 to 75 kg/m³ of milling fluid are useful such as 35 to 55 kg/m³.

For any particular diversion agent, break down time may vary depending on temperature, pH, salinity and these factors may be considered to provide for adequate diversion during the working time for the intervention. In one embodiment, if wellbore conditions do not support a selected break down time for a diversion agent, the diversion agent can be introduced and the wellbore conditions can be modified to assist with the break down process. In one embodiment, for example, a degradation accelerator can be pumped downhole in order to adjust downhole temperature, pH and/or salinity to facilitate diversion agent degradation. In one embodiment, for example, where IBDU is employed as the diversion agent, a degradation accelerator can be employed that raises the pH of the downhole fluid to which the IBDU is exposed. Such a degradation accelerator, may for example, be a chemical that lowers the pH of the fluid downhole, for example a solid acidic material that breaks down over time to lower the fluid pH. The solid acidic material may for example be one that includes or generates citric acid. The solid acidic material may be configured, such as with a coating, to delay its dissolution. In one embodiment, an accelerator of resin covered citric acid is pumped with the IBDU. This may be useful in conditions where the formation temperature at $P_f$ is less than about 80-100° C.

In one embodiment, a bypass sub 10c is included in the assembly above the motor 10b. The method may include opening the bypass sub and introducing an amount of diversion agent out through opened ports 50 of the bypass sub to more rapidly introduce diversion agent to plug the formation. The diversion agent may be introduced through the bypass sub after an amount of diversion agent is introduced through the motor and mill. In such an embodiment, a first particle size diversion agent may be introduced through the motor and mill and a second amount of diversion agent, arrows D', having a larger particle size than that of the first particle size is then placed through the bypass sub.

Figure 2:
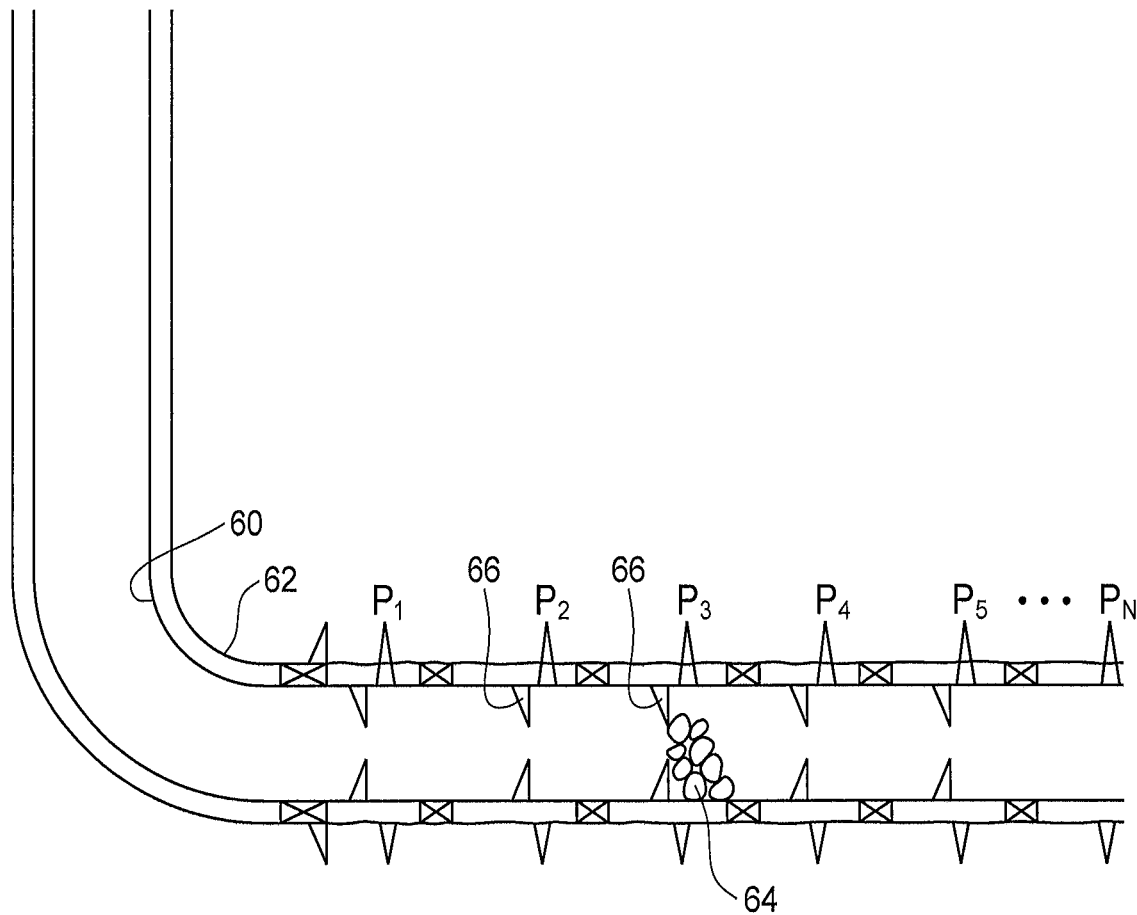
FIG. 2 is a sectional view through a wellbore illustrating a possible low pressure zone scenario.
Figure 3:
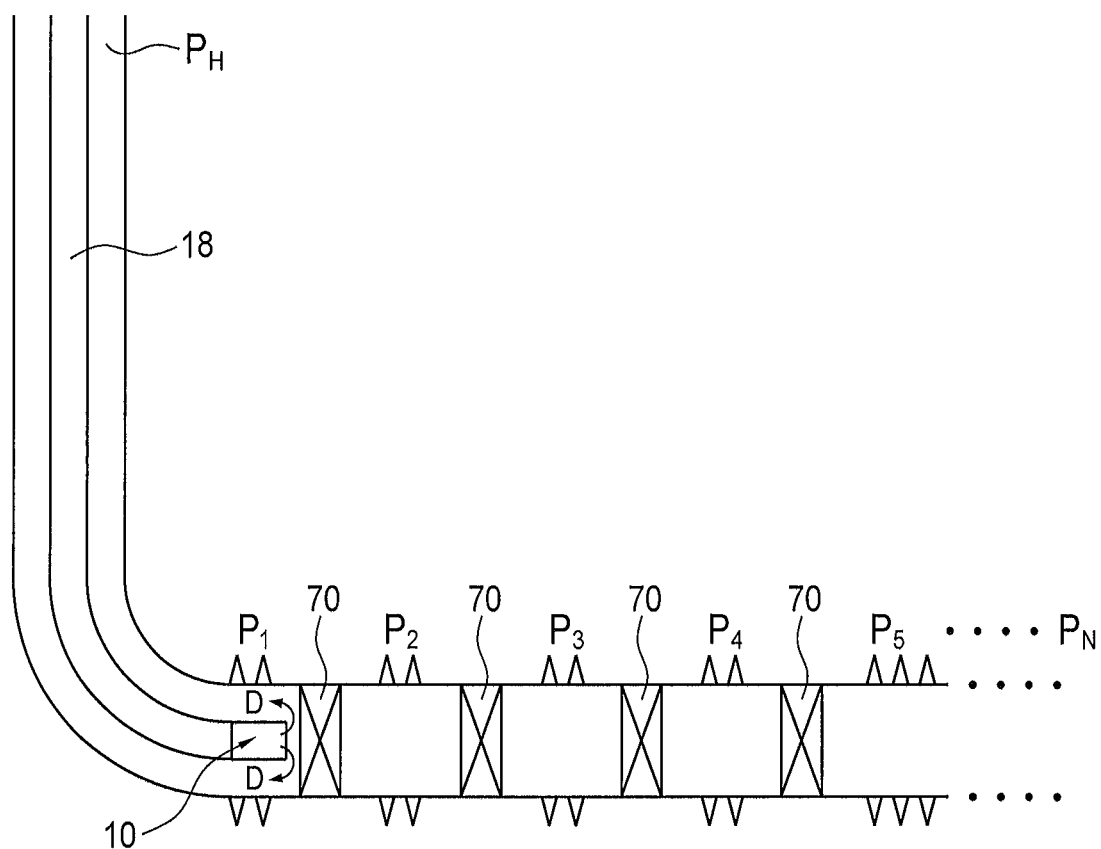
FIG. 3 is a sectional view through a wellbore illustrating another possible low pressure zone scenario.

A low pressure zone may be encountered at a zone in the well or through a port, such as a ported tubular or perforation, when a sleeve, plug, blockage or debris is removed to open access to low pressure zone of a well, such as an underpressure or a depleted zone of the well. For example, the low pressure zone may be a uniform sub-hydrostatic reservoir, as shown in FIG. 1. Other possible low pressure zone scenarios are illustrated in FIGS. 2 and 3, wherein there are one or more sub-hydrostatic thief zones. For example, FIG. 2, shows a typical ball drop completion open hole production well where a multistage liner 60 is set in an open hole well 62 and has opened access to a plurality of zones $P_1$-$P_N$. A blockage 64 at a constriction such as a seat 62, has depleted the zones accessed uphole of the blockage $P_1$ and $P_2$. Thus, since $P_3$ to $P_N$ actually has a pressure greater than $P_1$ and/or $P_2$, the depleted zones may become thief zones and may require diversion during a milling operation to remove seats 66 and/or blockage 64.

FIG. 3 shows another wellbore configuration where plugs such as bridge plugs 70 have been set in the well 72 to isolate a plurality of zones $P_1$-$P_N$ from each other. Each zone can have a different pressure. Diversion agent, arrows D, may be introduced during an operation to remove plugs 70 with a milling assembly 10, through pump 10b and milling tool 10a, where any one or more of zones $P_1$-$P_N$ have a pressure less than hydrostatic pressure $P_H$.

The following example is provided to show utility of the invention, but is not intended to limit the scope of the invention to the particular exemplification.

Example: Procedures for Mixing and Launching a IBDU Pill Through Coil, PDM and Milling Tool Equipment:
Twin fluid pump
Mixing displacement tank
Coiled tubing with positive displacement motor and milling tool. It is recommended that nozzles are minimum ¼" in diameter.

Operations:
When milling in an underpressured well (i.e. hydrostatic pressure is greater than bottom hole pressure), or when there are indications of possible or actual lost circulation.

Add two bags of 100 Mesh IBDU such as STEPvert LT™ available from STEP Energy Services Ltd. to fluid in a displacement tank (45 kg/m³), engage agitation paddle to maximum RPM (if paddle is not spinning fast enough to mix fluid, increase paddle speed) to ensure mixing. Continue mixing or, as noted above, displace while IBDU is added.

To avoid the IBDU settling out prior to arriving downhole, adjust the fluid if necessary to increase the carrying capacity of the fluid such that solid IBDU is able to remain suspended for the period of time it takes to get downhole. This may be achieved by pump rate and/or addition of viscosifiers. Thus, to better suspend solids:

A gelling agent is added: For example liquid gel hydroxyethyl cellulose 5 L/m³ (2 kg/m³ if dry gel) is added to the displacement tank with a target hydration time of 3 minutes; and/or Slowly pour IBDU into the mixing tub while displacing to ensure no product settles out.

Add a degradation accelerator if needed. Consider Table 1 where IBDU solubility is summarized with and without a citric acid accelerator based on 45 kg/m3 loading of IBDU in water or brine:

TABLE 1

Based on 2 bag STEPvert LT Diversion Pill (in water or brine)

| | No Accelerator Solubility, % | | | | | |
|---|---|---|---|---|---|---|
| Temperature | 24 Hours | 48 Hours | 96 Hours | Accelerator HT Loading | 50% Dissolution Time | 100% Dissolution Time |
| 50° C. | 14 | 20 | 32 | 5 kg | 1.5 days | 5 days |
| 60° C. | 18 | 24 | 35 | 4 kg | 1 day | 3 days |
| 70° C. | 32 | 35 | 51 | 2 kg | 1 day | 2 days |
| 80° C. | 51 | 96 | 98 | 1 kg | 1 day | 2 days |
| 90° C. | 89 | 96 | 98 | 0 kg | 8 hours | 24 hours |

Generally if the formation temperature is less than 90° C., use a degradation accelerator, such as a resin coated citric acid such as Accelerator HT™ available from STEP Energy Services Ltd. The citric acid reduces pH in order to reduce degradation time of the IBDU. The resin coating ensures that the citric acid substantially will not begin to act until it reaches formation temperature. The resin breaks down to expose the acid and the acid then reduces pH and expedites degradation.

The pill of the IBDU, possibly including degradation accelerator, is launched. If a twin pump is employed, pump only through one fluid end and isolate the idle side. This ensures diverter only enters one side of plumbing. This is an operational efficiency, where only one fluid end is exposed to diverter in case it collects in large quantities and holds a valve and seat open. By always keeping one side "clean" (no solids) operational risks are mitigated.

Maintain a minimum rate of at least about 0.2 m³/min or possibly about 0.4 m³/min through the single fluid end (higher rate is better to aid in carrying solids). If fluid is comingled with gas such as nitrogen, lower rates may be used. As noted above, to avoid settling at lower rates, options include: slowly pouring IBDU in to mixing tub while displacing to ensure no product settles out, or increasing gel loading to better suspend solids.

The slurry of IBDU in fluid goes through the coil and the mud motor and is pumped out through the nozzles of the milling tool.

Once pill is away, flush the pump with fluid, for example, we suggest a minimum of 3 m³ fluid is flushed through the fluid end that the diverter was pumped through prior to disengaging the pump. This ensures the fluid end has been properly flushed.

Track volume from when pill enters the coil to when it is expected to reach open formation. Record the time that each pill reaches formation/exits coil BHA on treatment report (include surface iron in volume calculation). In case a large pressure event occurs when the pill exits the downhole pump, only one pill is to be inside coil at any given time.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

The invention claimed is:

1. A method for milling a wellbore structure comprising: pumping fluid through a mud motor and a milling tool while the milling tool and the mud motor are moved on a string to mill out a wellbore structure; conveying a diversion agent with the fluid through the string, mud motor and milling tool to introduce the diversion agent to the wellbore, the diversion agent mitigating fluid loss in a low pressure zone; and, conveying a degradation accelerator into the wellbore, the degradation accelerator acting in the wellbore to decrease the pH to speed up degradation of the diversion agent.

2. The method of claim 1 wherein the diversion agent is isobutylidene diurea.

3. The method of claim 1 wherein the diversion agent has a particle size of 8-200 mesh.

4. The method of claim 1 further comprising selecting the milling tool to have nozzles of at least ¼" diameter.

5. The method of claim 1 further comprising opening a bypass sub above the mud motor and introducing a second amount of diversion agent out through opened ports of the bypass sub.

6. The method of claim 5, wherein the diversion agent has a first particle size and the second amount of diversion agent has a larger particle size than the first particle size.

7. The method of claim 1 further comprising adding a gel to the fluid to increase carrying capacity of the fluid.

8. The method of claim 1 wherein conveying includes adding the diversion agent to the fluid as the fluid is pumped into the wellbore to maintain the diversion agent suspended in the wellbore.

9. The method of claim 1 wherein conveying includes pumping a slurry of the diversion agent in the fluid through coiled tubing and further comprising deferring the introduction of any further diversion agent slugs to the coiled tubing until the slurry has exited the milling tool.

10. The method of claim 1 wherein the mud motor includes an elastomeric stator and a helical rotor in the elastomeric stator and wherein conveying forces the diversion agent and the fluid through a series of cavities between the helical rotor and the elastomeric stator to cause the helical rotor to rotate and to drive rotation of the milling tool.

11. A method for milling a wellbore structure comprising: pumping fluid through a mud motor and a milling tool while the milling tool and the mud motor are moved on a string to mill out a wellbore structure; conveying a diversion agent with the fluid through the string, mud motor and milling tool to introduce the diversion agent to the wellbore, the diversion agent mitigating fluid loss in a low pressure zone; and, opening a bypass sub above the mud motor and introducing a second amount of diversion agent out through opened ports of the bypass sub, the diversion agent has a first particle size and the second amount of diversion agent has a larger particle size than the first particle size.

12. The method of claim 11 wherein the diversion agent is isobutylidene diurea.

13. The method of claim 11 wherein the first particle size is 8-200 mesh.

14. The method of claim 11 further comprising selecting the milling tool to have nozzles of at least ¼" diameter.

15. The method of claim 11 further comprising adding a gel to the fluid to increase carrying capacity of the fluid.

16. The method of claim 11 wherein conveying includes adding the diversion agent to the fluid as the fluid is pumped into the wellbore to maintain the diversion agent suspended in the wellbore.

17. The method of claim 11 wherein conveying includes pumping a slurry of the diversion agent in the fluid through coiled tubing and further comprising deferring the introduction of any further diversion agent slugs to the coiled tubing until the slurry has exited the milling tool.

18. The method of claim 11 wherein the mud motor includes an elastomeric stator and a helical rotor in the elastomeric stator and wherein conveying forces the diversion agent and the fluid through a series of cavities between the helical rotor and the elastomeric stator to cause the helical rotor to rotate and to drive rotation of the milling tool.

19. A method for milling a wellbore structure comprising: pumping fluid through a mud motor and a milling tool while the milling tool and the mud motor are moved on a string to mill out a wellbore structure; conveying a diversion agent with the fluid through the string, mud motor and milling tool to introduce the diversion agent to the wellbore, the diversion agent mitigating fluid loss in a low pressure zone, wherein conveying includes pumping a slurry of the diversion agent in the fluid through coiled tubing; and, deferring the introduction of any further diversion agent slugs to the coiled tubing until the slurry has exited the milling tool.

20. The method of claim 19 wherein the diversion agent is isobutylidene diurea.

21. The method of claim 19 wherein the diversion agent has a particle size of 8-200 mesh.

22. The method of claim 19 further comprising selecting the milling tool to have nozzles of at least ¼" diameter.

23. The method of claim 19 further comprising adding a gel to the fluid to increase carrying capacity of the fluid.

24. The method of claim 19 wherein conveying includes adding the diversion agent to the fluid as the fluid is pumped into the wellbore to maintain the diversion agent suspended in the wellbore.

25. The method of claim 19 wherein the mud motor includes an elastomeric stator and a helical rotor in the elastomeric stator and wherein conveying forces the diversion agent and the fluid through a series of cavities between the helical rotor and the elastomeric stator to cause the helical rotor to rotate and to drive rotation of the milling tool.

* * * * *